Oct. 21, 1958     A. K. SIMONS ET AL     2,856,984
SEAT STRUCTURE FOR TRUCKS

Original Filed Aug. 23, 1955     4 Sheets-Sheet 4

INVENTORS
Allison K. Simons
Arthur O. Radke
Albert F. Hickman
by Popp and Sommer
Attorneys.

United States Patent Office 2,856,984
Patented Oct. 21, 1958

2,856,984

SEAT STRUCTURE FOR TRUCKS

Allison K. Simons, Shorewood, and Arthur O. Radke, Milwaukee, Wis., and Albert F. Hickman, Eden, N. Y., assignors to Hickman Industries, Inc., Eden, N. Y., a corporation of New York Original application August 23, 1955, Serial No. 530,122. Divided and this application October 15, 1957, Serial No. 693,224

2 Claims. (Cl. 155—50)

This application is a division of copending application Serial No. 530,122, filed August 23, 1953.

This invention relates to a seat structure and more particularly to such a seat structure designed for use in truck cabs, the seat being shown as an individual seat designed to support the driver of the truck.

General objects of the present invention are to provide a seat which has superior ride characteristics; which provides the maximum vertical movement of the seat frame without interference and absorbs objectionable jars and vibrations of all frequencies; in which the suspension is arranged below the seat; which is composed of simple parts or sub-assemblies and is adapted to mass production; which is strong and durable in construction and will operate smoothly and easily without damage; which is light in weight; and which is free from projecting parts adapted to injure the rider or interfere with his operation.

A specific object of the present invention is to provide in a seat structure a very simple and effective mechanism for adjusting the angularity of the back cushion with reference to the back part of the frame so that the operator can adjust it to the angularity most suited for his comfort.

Another object of the invention is to provide a simplified form of base part of the seat structure which includes means for adjusting the seat structure fore-and-aft and which also supports the spring suspension which carries the seat part of the seat structure.

Another object of the invention is to provide a simple and effective means for limiting the upward movement of the seat part of the seat structure and which also determines the back pressure against which pretensioning of the main springs of the seat structure is effected and also restrains the seat part of the seat structure against sidewise lurching.

Another object is to provide a simplified and strong movable frame for a truck seat, the tubular frame being composed principally of formed metal tubes and a stamping and cross bars connecting the bottom parts of said tubes.

Another object is to provide simplified and strong shackles for the linkage supporting the seat part of the seat structure on the base part thereof.

Other objects and advantages of the present invention will be apparent from the following description and drawings in which:

Fig. 7 is a horizontal section taken generally along line 7—7, Fig. 2.

Figure 1:
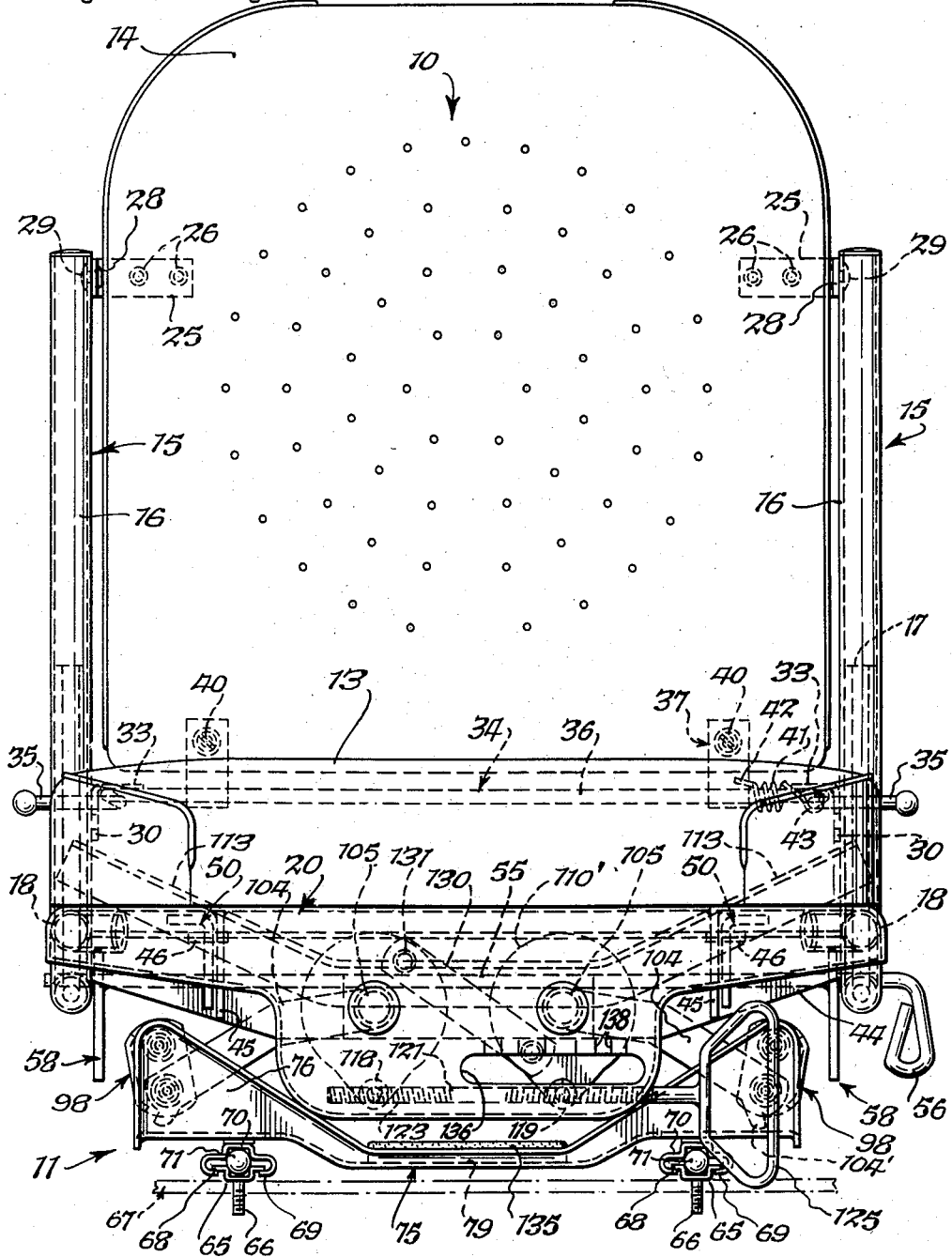
Fig. 1 is a front elevational view of a resiliently mounted seat structure embodying the present invention.

The seat structure embodying the present invention is particularly designed for use in the cabs of highway trucks and the like and includes a seat part 10 supported on a base part 11 by a suspension embodying the present invention. The seat part 10 is shown as including a detachable seat cushion 13 and a detachable back cushion 14 carried by a metal frame. This metal frame is shown as comprising a pair of L-shaped tubular side bars 15, each having a vertical back part 16 which extends alongside the back cushion 14 and a horizontal bottom part 18 which extends under the corresponding side of the seat cushion 13. The bend between the parts 16 and 18 can can be reinforced by an internal tube 17. The forward ends of the horizontal bottom parts 18 of these tubular side bars 15 are bent toward each other, as indicated at 19, and a metal stamping 20 embraces these inwardly turned ends 19 and can be secured thereto in any suitable manner, as by welding.

The upper edge 21 of the metal stamping 20 is formed to conform to the curvature of the tubular side frame members 15 and this stamping has a depending apron or flange 22 which can be flanged, as indicated at 23, to impart the desired rigidity to this apron.

A small L-shaped bracket 25 is secured, as by screws 26, to each side of the back cushion 14 at the rear thereof so as to provide a forwardly projecting ear 28 arranged to contact the inner side of the corresponding upright back part 16 of the tubular side frame member near the upper extremity thereof. Each ear 28 is joined to this upper extremity by a pivot pin in the form of a simple rivet 29, the pivot pins 29 being in horizontal alinement so that the back cushion 14 is free to swing about these pivots as an axis.

A feature of the invention resides in the adjustability of the angularity of the back cushion and to this end a vertical toothed plate 30 is welded to the inside of each vertical back part 16 of the seat frame. These vertical plates project forwardly from the vertical back parts or tubes 16 of the seat frame and each is provided with a horizontal slot 31 the upper edge of which is indented to provide a series of detent notches or teeth 32. Each vertical toothed plate 30 is provided along its upper edge with a horizontal stiffening flange 33.

A horizontal spring loaded detent rod 34 is journalled on the back cushion 14 and is provided with offset ends 35 which project into the slots 31 and releasably engage the notches 32 formed in the tops of these notches. The straight central part 36 of this detent rod is journalled in a pair of strap bearings 37 each consisting of a metal strap bent at its center to provide a cylindrical bushing 38 which embraces the central part 36 of the detent rod and a pair of tangentially projecting ends 39 arranged face-to-face and secured by bolt or screw fasteners 40 to the back of the seat cushion 14 in any suitable manner.

A helical spring 41 surrounds one end of the straight central part 36 of the detent rod between the corresponding strap bearing 37 and the vertical back part 16 of the seat frame and one end 42 of this spring is anchored in this strap bearing 37 while its other end is formed to provide a hook 43 which extends under and biases upwardly the corresponding offset end 35 of the detent rod. Accordingly this spring 41 holds the offset ends 35 of the detent rod upwardly into a selected pair of notches 32 of the side plates 30. When it is desired to alter the angularity of the back cushion 14 either offset end 35 of the detent rod is pushed down out of this pair of notches. The back cushion 14 can then be swung backwards or forwards about the pivot 29 until it is disposed at the desired angularity. The offset end 35 so pushed down is then released so that both offset ends 35 spring up under the influence of the spring 41 into another pair of the notches 32.

Figure 3:
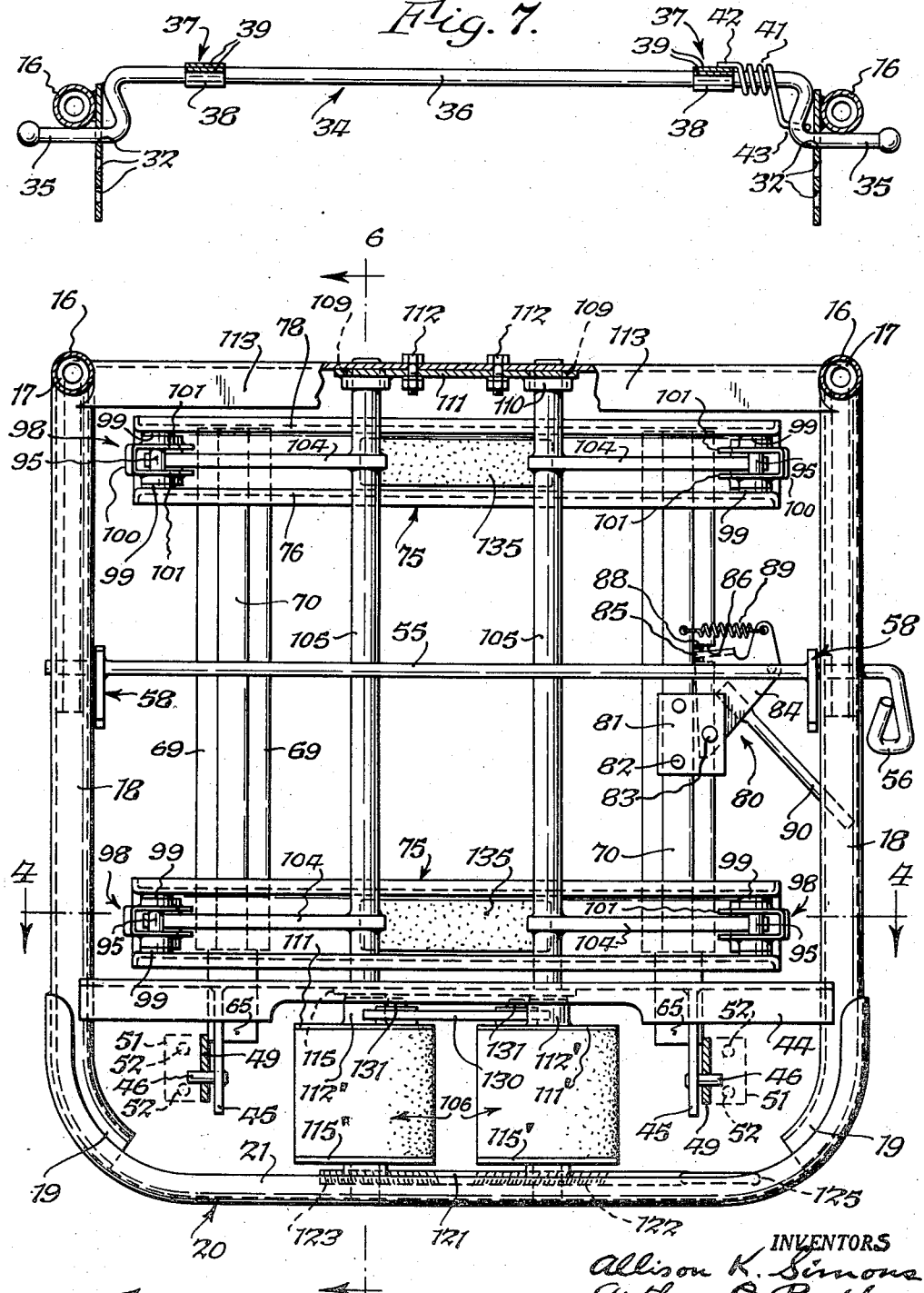
Fig. 3 is a horizontal sectional view taken generally on line 3—3, Fig. 2.

As best shown in Fig. 3, a cross bar 44, shown as being L-shaped in cross section, is welded at its ends to the horizontal bottom parts 18 of the tubular side frame members 15.

This cross bar 44 is arranged in rearwardly spaced relation to the front stamping or apron 20 and carries a pair of forwardly projecting ears 45, each of which carries a horizontal pin 46, these pins extending outwardly toward the corresponding tubular frame member 15. Each of these pins is shown as riding in a J-shaped slot 48 provided in the vertical ear 49 of an L-shaped bracket 50, this L-shaped bracket also having a horizontal ear 51 which is secured, as by screws 52, to the under side of the seat cushion 13 at the forward end thereof. The J-shaped slot 48 has a relatively long upstanding portion 52' at its front end and a relatively short upstanding portion 53 at its rear end. When the pins 46 seat in the upper ends of the relatively long upstanding portions 52 of the J-shaped slots 48, the front end of the seat cushion is supported at a relatively low elevation. When these pins are supported in the relatively short upstanding portions 53, the front end of the seat cushion is supported at a relatively high elevation. In either case, the seat cushion 13 is capable of swinging about the pins 46 as a fulcrum.

The rear end of the seat cushion is preferably adjustable to a number of elevations, particularly to determine the angularity of the seat cushion with reference to the horizontal, this angularity being also related, of course, to the selected reclining position of the back cushion 14. For this purpose, a rod 55 extends through the horizontal bottom parts 18 of the tubular side frame members 15 and is capable of turning, this rod being provided at one end with a handle 56 for turning the same. Against the inner face of each of these horizontal bottom parts 18 of the tubular side frame members 15, a plate 58 is secured, as by welding, to the rod. These plates 58 are of generally elongated rectangular form with the rod 55 extending eccentrically through one corner thereof. It will therefore be seen that the edges 59, 60, 61 and 62 are progressively more distant from the axis of the rod 55 so that by turning the rod to engage the bottom of the seat cushion with one or the other of these edges, the seat cushion will be supported at a corresponding elevation. Desirably, these edges 59—62 engage metal plates 63 provided on the bottom of the seat cushion 13 near the rear end thereof.

The base part 11 of the seat structure comprises a pair of spaced horizontal channels 65 which can be secured by screws 66 to the chassis 67, these channels being arranged parallel and extending fore-and-aft and being arranged below the seat part 10 of the seat structure. Each of these channels has opposite horizontally extending flanges 68 which are embraced by reversely bent flanges 69 of an inverted channel 70. A series of ball bearings 71 are contained within the channels 69 and 70 and permit free fore-and-aft movement of each channel 70 with reference to the corresponding channel 65. Any suitable means (not shown) can be provided for retaining the balls 71 in position.

Figure 2:
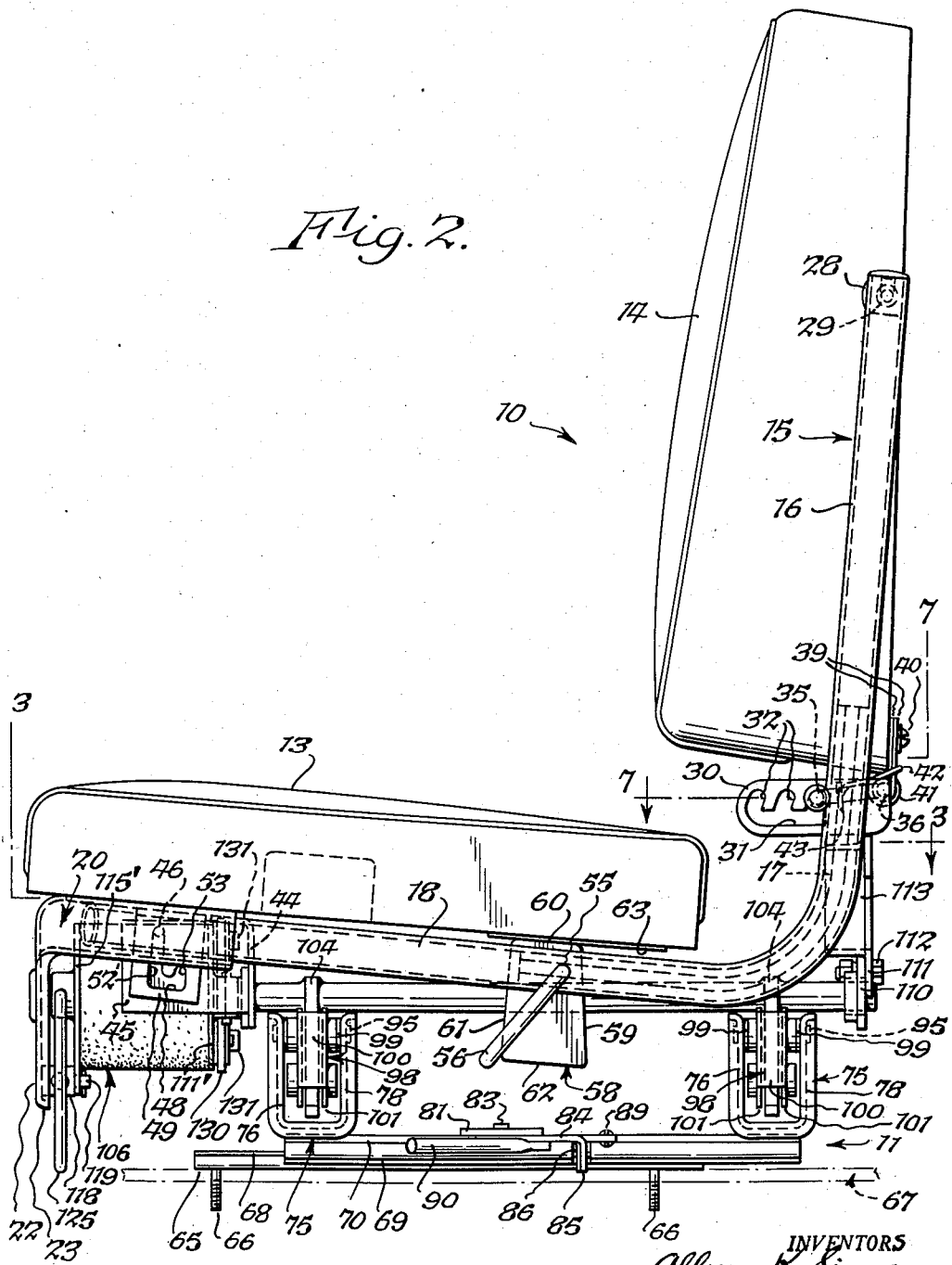
Fig. 2 is a side elevational view thereof.

The front and rear ends of the channels 70 are connected to each other by sheet metal cross pieces 75 which are U-shaped in cross section with end channels opening upwardly, each of these cross pieces having relatively high front and rear walls 76, 78 and having a depressed central part 79. These cross pieces 75 form the principal cross members of the base part 11 of the seat structure and an adjustment, indicated generally at 80, is provided for moving and securing these cross channels 75 and the top channel 70 at different fore-and-aft positions along the bottom channels 65. As best shown in Figs. 2 and 3, this adjusting mechanism includes a plate 81 which is secured as by rivets 82, to one of the sliding channels 70 to extend horizontally outwardly therefrom. The outboard end of the plate 81 carries a pivot 83 which supports a latch member 84. This latch member 84 is provided with a tooth 85 which is movable through a slot 86 provided in the corresponding movable channel 70. This tooth 85 is arranged to engage one of a series of teeth 88 provided in the corresponding side flange 68 of the channel 65. A helical compression spring 89 connects the outer extremity of the latch member 84 with the sliding channel member 70, thereby to hold the tooth 85 in engagement with any selected tooth 88. A handle 90 is provided for manipulating the latch member 84, particularly to disengage the teeth 85, 88 and following which the sliding channels 70 can be moved longitudinally along the fixed channels 65.

Figure 4:
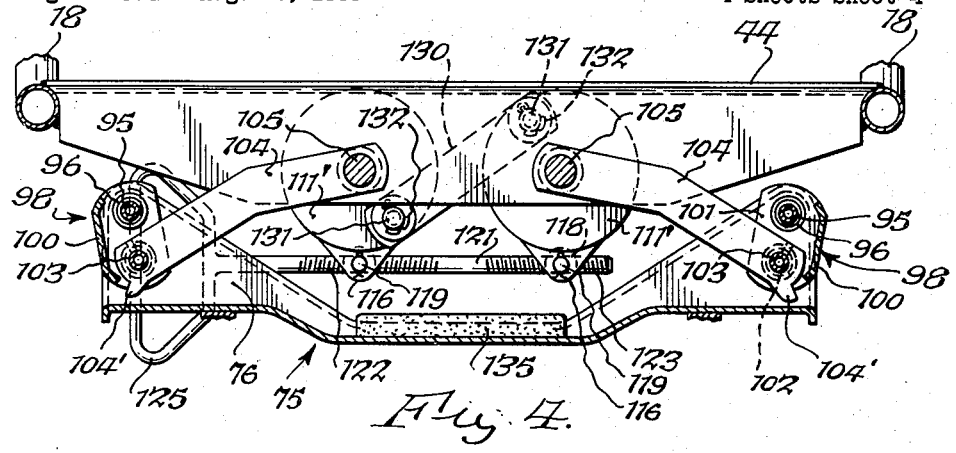
Fig. 4 is a vertical transverse sectional view taken generally on line 4—4, Fig. 3.

A tubular base pivot pin 95 is mounted in each end of each sheet metal cross piece 75, these pins extending fore-and-aft. For this purpose, each base pivot pin 95 is mounted at its ends in the front and rear side walls 76, 78 at the upper, outer extremity thereof as best shown in Fig. 4. These base pivot pins 95 can be secured in any suitable manner and each supports a bearing bushing 96 at the upper end of a shackle 98, thrust washers 99 being also preferably provided at the opposite ends of each bearing bushing 96.

The shackle 98 is preferably made of sheet metal to be U-shaped or channel shaped in cross section, having a cross back part 100 and parallel side flanges or walls 101 through which the bearing bushing 96 extends and to which this bearing bushing is secured. The opposite or lower end of the shackle similarly has secured thereto a bearing bushing 102 in which is journalled a crank arm pivot pin 103. This crank arm pivot pin is fast to the outer end of a crank arm 104, the inner end of each crank arm 104 being fast to a fulcrum rod 105 which extends fore-and-aft. An important feature of the invention resides in the provision of a stop 104' projecting from the outer end of each crank arm 104 and which in the position of maximum elevation of the seat part of the seat structure (illustrated in Fig. 5) engages the corresponding edge of the back part 100 of the shackle 98. These four stops 104' not only limit the upward movement of the seat when unloaded, but also limit the lateral movement of the seat when loaded so as to prevent sidewise lurching of the seat.

Figure 6:
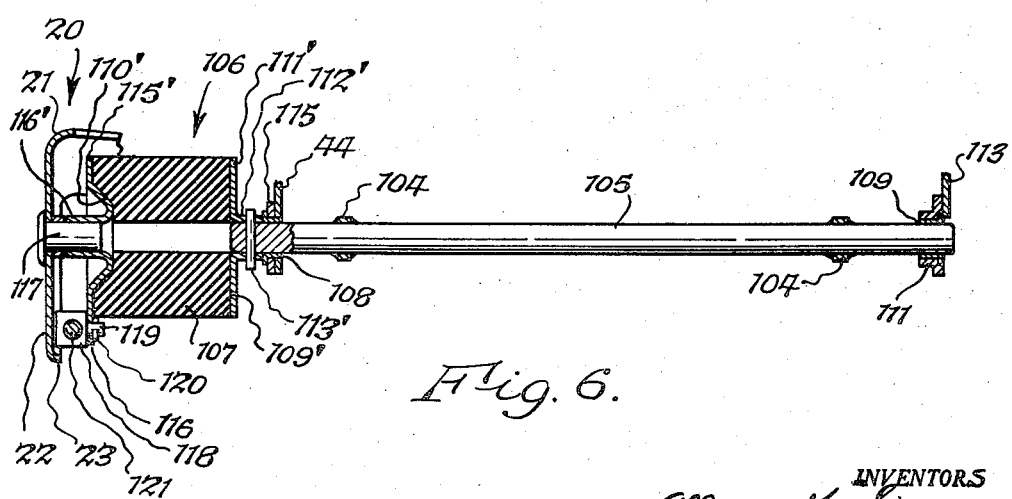
Fig. 6 is a fragmentary vertical section taken on line 6—6, Fig. 3.

As best shown in Fig. 6, each end of each fulcrum rod is journalled in a bearing bushing 108, 109, the back bearing 109 being fitted in a boss 110 projecting forwardly from a plate 111, this plate 111 being removably secured, as by bolts 112 (Fig. 3), to the vertical flange of an L-shaped cross bar 113 connecting the ends of the vertical parts 16 of the tubular side frame members 15. Each bearing bushing 108 is fitted in a hole provided in the L-shaped cross bar 44 and a washer 115 can be welded to this cross bar around this hole so as to provide adequate support for the bearing bushing 108. Intermediate this cross bar 44 and the front stamping or apron 20, each fulcrum rod 105 connects with a rubber spring 106, these rubber springs providing the resilient support for the seat part of the seat suspension.

Each of these rubber torsion springs can be of any suitable construction and is shown as comprising a cylindrical tubular rubber body 107 having a flat face 109' at one axial end and having a concave face 110' at its opposite axial end. To the outer flat face 109' of each rubber body 107 is vulcanized a metal disk 111' having a hub 112' which fits the adjacent end of the corresponding fulcrum rod 105 and can be secured thereto in any suitable manner as by the cross pin 113' shown. To the opposite concave face 110' of each rubber body is vulcanized a conforming convex metal anchoring plate or member 115', this anchoring plate having an outwardly projecting ear 116. This anchoring plate also has a tubular hub 116' journalled on a pin 117, the latter projecting from the depending apron or flange 22 as best shown in Fig. 6.

A nut 118 is fitted against each of these ears 116, this nut being provided with a stem 119 which extends through the companion ear 116 and is secured in this opening by a pin 120. An adjusting rod 121 has oppositely threaded ends 122 and 123 each of which is respectively screwed into the corresponding nut 118. One end of this rod is extended and is formed to provide a handle 125 by means of which the rod 121 is turned to adjust the anchoring plates 115' of the rubber springs 106 in unison. The opposite ends of the adjusting rod 121 and the nuts 118 are, of course, reversely threaded.

To minimize sidewise tipping or lurching of the seat part 10, the two fulcrum rods 105 are interconnected so as to rotate in unison. The connection between these two fulcrum rods is shown as being in the form of a link 130, pivotally connected at its opposite ends to the metal disks 111' of the two rubber springs 106. For this purpose, each of these metal disks 111' has mounted thereon a pin 131 which extends through an opening in the corresponding end of the link 130 and also carries a cotter pin 132 which retains the link on the pin.

A bottoming cushion 135 is secured in the center of each of the channel shaped sheet metal cross members 75, these being in position to engage the fulcrumed ends of the crank arms 104 when the seat part fully bottoms.

To calibrate the amount of pretensioning of the springs 106, the front apron can be provided with a horizontal sight opening 136 in line with the nuts 119 and this nut can carry a vertical mark as shown in Fig. 1. This mark can traverse a calibrated scale 138 above the sight opening.

Assuming the normal loaded position of the seat illustrated in Figs. 1 through 4 and 6, in the operation of the suspension, the upward movement of the chassis or body 67 of the truck, through the stationary channels 65, balls 71, adjusting channels 70, channel shaped cross pieces 75, and shackles 98 moves the outer or free ends of the crank arms 104 upwardly. This rotates the fulcrum rods 105, these fulcrum rods rotating in their bearings 108, 109, the bearings 108 being mounted on the vertical flange of the cross bar 44 of the seat part 10 of the seat structure and the bearings 109 being mounted on the cross bar 113 through the removable plate 111 which is secured to the cross bar 113 to project downwardly therefrom.

The oscillation of each fulcrum rod 105 is resisted by the corresponding rubber spring 106, this movement being transmitted through the pins 113' to the disk 111' vulcanized to the flat rear face 109' of the rubber body 107 of each rubber spring. Since the forward end of each rubber body 107 is vulcanized to the convex anchoring plate 115', the torsional force imposed on each rubber body 107 by its fulcrum rod 105 is transmitted to the downwardly extending ears 116 of these convex metal anchoring plates 115'. These two ears 116 are adjustably connected together by their swivel pin-nuts 118, 119 and the reversely threaded screw 121 in these nuts and hence it will be seen that these connected ears 116 provide a non-rotating anchorage for the forward ends of the rubber springs 106. When it is desired to increase the pretensioning or windup of the springs, the threaded rod 121, through its handle 125, is turned in a corresponding direction. If the seat is not occupied at the time of so adjusting the pretensioning of the rubber springs 106, the back pressure against which this pretensioning is made is supplied by the stops 104' at the outer ends of the crank arms 104. Thus, the torsional force of the rubber springs 106 tends, of course, to lift the seat part 10 and to bring the crank arms 104 and links 98 to the position shown in Fig. 5 in which the stops 104' engage the cross parts 100 of the shackles 98. Since the parts cannot be elevated above the position shown in Fig. 5, further turning of the handle 125 to increase the tension of the rubber springs 106 merely serves to increase the pretensioning or windup of the springs. The degree of windup is indicated by the mark on the nut 119 (Fig. 1) traversing the calibrations 138.

Lateral tipping of the seat part 10 is minimized by the link 130 interconnecting the end plates 109' of the two rubber springs 106. This link pivotally connects these end plates 109' to rotate in unison and since these end plates are fixed to the two fulcrum rods 105 by the pins 113, this link compels the two fulcrum rods 105 to rotate in unison. It will be noted by the positioning of the link 130 as shown, the swinging movement of one pair of crank arms 104 can occur only when there is a corresponding movement of the other pair of crank arms 104. At the same time, the seat part 10 is capable of lateral movement which is permitted by the shackles 98.

When the seat part 10 so moves downwardly relative to the base part 11 from the normal loaded position shown in Figs. 1 through 4 and 6, or, when the base part 11 is forced upwardly relative to the seat part 10, the effective opposing force of the rubber springs 106 increases at a geometric and not at an arithmetic rate. In this particular case, the geometric rate of change of resilience is of the accelerated increase type in which increments of vertical movement of the base part are opposed by an accelerated rate of increase of resilient resistance. This is due to the progressive decrease in the effective leverage of the crank arms 104 as they swing from the position shown in Fig. 4 about their fulcrum rod axes of rotation. This action is also influenced by the fact that increments of vertical displacement of the outer ends of the crank arms 104 cause accelerated rates of increase in the angular displacement of the rubber torsion spring 106. This latter is due to the fact that increments of vertical movement of the outer ends of the crank arms 104 are not proportional to the accompanying increments of angular twist to which the rubber springs are subjected.

This geometric action also occurs when the base part 11 moves downwardly relative to the seat part 10 from the normal loaded position shown in Figs. 1 through 4 and 6. Throughout this particular movement, the geometric action is of the accelerated decrease type, that is, as the base part 11 passes through increments of downward movement, the rate of decrease of the resilient force tending to push the seat part downwardly increases.

By this means, so far as vertical forces are concerned, the seat part 10 is free to "float" along solely under the influence of gravity (plus whatever vertical momentum forces are present), this feature being of particular significance when it is realized that the occupant is also, at this time, solely under the influence of gravity (plus whatever vertical momentum forces are present). The consequence is that within this particular range of movement, the occupant of the seat moves vertically up and down with the same acceleration and deceleration as the seat part 10 and hence without changing the pressure between the occupant and the seat. Such a desirable result is quite different from that obtained from conventional seat suspension means in which the vertical force jerks the seat down whenever the strain imposed on the seat part is negative. With the present seat suspension means, no such forces tending to pull the seat part downwardly are possible.

Figure 5:
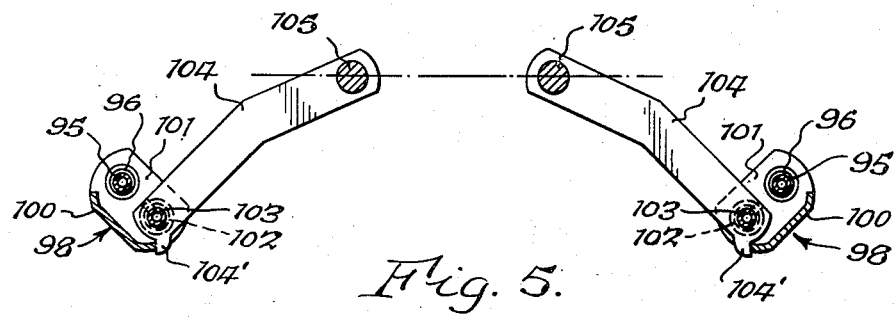
Fig. 5 is a fragmentary view similar to Fig. 4 and showing another position of the parts and in particular showing the effect of a pair of double purpose stops, the purposes of these stops being to determine the amount of loading or windup of the springs when the seat is unloaded and also to prevent side lurching of the seat when the seat is occupied.

It will particularly be noted that the stops 104', in addition to limiting the upward movement of the seat part 10, as illustrated in Fig. 5, and hence providing the back pressure against which the pretensioning of the rubber springs 106 is effected, also serve positively to limit lateral movement or lurching of the seat part particularly when the seat part is in an elevated position.

It will also be seen that the angularity of both the back and the seat cushions 14 and 13 can easily be adjusted to suit the driver. Thus by pushing down either offset end 35 of the detent rod journalled on the back cushion part 14 the opposite offset ends 35 are pushed down out of the corresponding pair of notches 32 of the side plates 30. The back cushion 14 is then swung to the desired angularity about the pivots 29 and the offset end 35 so pushed down is released. Both offset ends 35 of the detent rod then spring up under the influence of the spring 41 into another pair of the notches 32 to hold the back cushion at the selected angularity. Since the seat cushion 13 is pivotally supported at its front end by the pin 46, turning the handle 56 to rotate the eccentrically supported plates 58 will progressively bring the edges 59, 60, 61 and 62 of these plates 58 into supporting engagement with the bottom of the seat part. Since these edges are at progressively increased distances from the axis of rotation of these plates 58, this adjustment serves to raise and lower the back part of the seat cushion 13.

It will also be noted that the front end of the seat cushion 13 can be adjusted to two different elevations by virtue of the J-shaped slots 48 in their depending brackets 49.

From the foregoing, it will be seen that the present invention provides a seat which in particular is fully adjustable throughout, including its fore-and-aft position, the elevation and angularity of the seat cushion with reference to the vertical, of the back cushion and the degree of pretensioning of the rubber torsion springs. It will further be seen that the seat can be made to operate in a highly desirable frequency range regardless of the weight of the occupant and that at the same time, the seat structure is rugged in construction and low in cost.

We claim:

1. A seat structure comprising a pair of seat frame sides, each having a horizontal bottom part and a vertical part arising from the rear end of the bottom part, a metal stamping connecting the front ends of said horizontal bottom parts and forming a depending apron, spaced front and rear cross bars connecting said frame sides, a pair of laterally spaced fore-and-aft fulcrum rods journalled in said cross bars and each having a pair of arms extending generally horizontally in opposite directions with reference to the other pair of arms, a base part, a shackle member connecting the outer end of each arm with said base part, a rubber body at the front end of each fulcrum rod and arranged in the space between said apron and the front cross bar, means securing the front end of each fulcrum rod to the adjacent end of the adjacent rubber body, a plate fast to the other end of each rubber body, means journalling each of said plates on said apron, and means adjustably securing said plates of both rubber bodies together.

2. In a seat structure having a base part, a seat part, a plurality of transverse lever arms fulcrumed on one of said parts and spring means resisting movement of said lever arms; the combination therewith of a shackle pivotally connecting the free end of each lever arm with the other of said parts and each comprising a piece of sheet metal of U-shaped form in cross section to have a cross part and sides extending vertically from said cross part, the outer end of each lever arm being arranged in one end of a corresponding shackle, a lever arm pivot pin connecting said sides of each shackle with the outer end of the corresponding lever arm, a base pivot pin connecting the other end of each shackle with said base part, and a stop projecting from the outer end of each lever arm into the path of the cross part of the corresponding shackle.

References Cited in the file of this patent

UNITED STATES PATENTS

| | | |
|---|---|---|
| 613,479 | Sampson | Aug. 6, 1918 |
| 2,682,295 | Hickman | June 29, 1954 |